Figure 1:
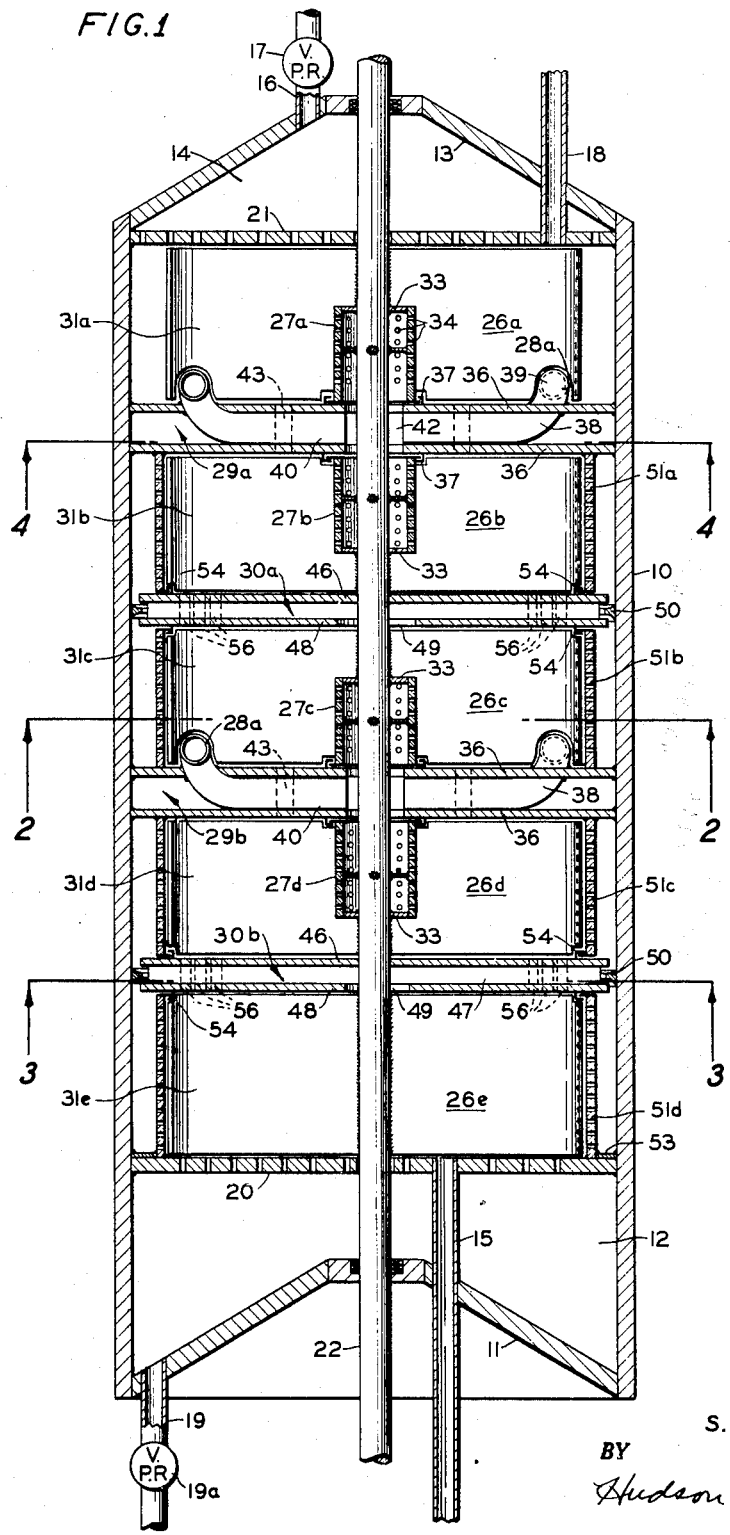

Feb. 21, 1956     S. C. CARNEY     2,735,755
METHOD OF LIQUID-LIQUID CONTACTING
Original Filed Nov. 18, 1948     2 Sheets-Sheet 1

INVENTOR.
S. C. CARNEY
BY
Hudson and Young
ATTORNEYS

Feb. 21, 1956  S. C. CARNEY  2,735,755
METHOD OF LIQUID-LIQUID CONTACTING
Original Filed Nov. 18, 1948  2 Sheets-Sheet 2

INVENTOR.
S. C. CARNEY
BY
Hudson and Young
ATTORNEYS

United States Patent Office 2,735,755
Patented Feb. 21, 1956

2,735,755

METHOD OF LIQUID-LIQUID CONTACTING

Samuel C. Carney, Bartlesville, Okla., assignor to Phillips Petroleum Company, a corporation of Delaware Original application November 18, 1948, Serial No. 60,778, now Patent No. 2,672,406, dated March 16, 1954. Divided and this application January 17, 1952, Serial No. 267,117

14 Claims. (Cl. 23—310)

This invention relates to a method of and apparatus for liquid-liquid contacting. In another aspect, it relates to a contacting unit for use in such apparatus.

There are numerous industrial operations in which two liquid phases are brought into intimate contact for the purpose of purification, separation or reaction. In one type of operation, known as liquid-liquid extraction, two liquid phases are brought into contact for the purpose of separating or extracting one or more of the components of one of the liquids by contact with a second liquid generally known as the solvent. Such liquid-liquid extraction processes are frequently used for separating various hydrocarbon mixtures, such as close boiling paraffins and naphthenes, which cannot be separated by fractionation. Two liquid phases are also brought into intimate contact in various treating operations in which some impurity, such as hydrogen sulfide, mercaptans or a small amount of an aluminum halide catalyst, is removed from a hydrocarbon mixture. A similar type of operation is also used in various catalytic hydrocarbon conversion processes, such as alkylation, in which the liquid phase hydrocarbon reactants are brought into intimate contact with a liquid phase catalyst so as to produce a reaction.

In accordance with the present invention, a very intimate contact is obtained between the liquids by dispersing droplets of liquid to be contacted into a continuous phase of a second liquid. The second liquid is preferably directed perpendicularly against the liquid droplets to produce a shearing action. The present invention contemplates the combination of this dispersion and shearing action with countercurrent movement of the heavy and light liquids, this shearing and dispersing action occurring continuously throughout a large region and at very high velocities.

The countercurrent action is made possible by centrifuging the liquids to be treated in several zones, thereby causing the heavier liquid to travel toward the periphery of each zone while the light liquid moves toward the center of the zone. As a result of this separation, the overall flow through the apparatus may take place in a countercurrent manner. I provide apparatus for supplying droplets of light liquid to the peripheral region of each treating zone and for supplying droplets of heavy liquid to the inner region of each zone. The droplets are dispersed into the centrifuge zones and sheared by the centrifuged liquids in these zones. The method and apparatus of this invention are well adapted to the use of several contacting stages, and enables several equilibrium extraction stages to be provided within a relatively short contacting zone.

It is an object of the invention to provide a method of and apparatus for effecting intimate contact between two immiscible liquids.

It is a further object of the invention to provide apparatus for effecting countercurrent movement of the liquids to be contacted with efficient contacting of the liquids as they move countercurrently through the mixing vessel.

It is a still further object of the invention to provide apparatus which is rugged and durable in construction, reliable in operation, of great simplicity, and which can be built at low cost.

Figure 2:
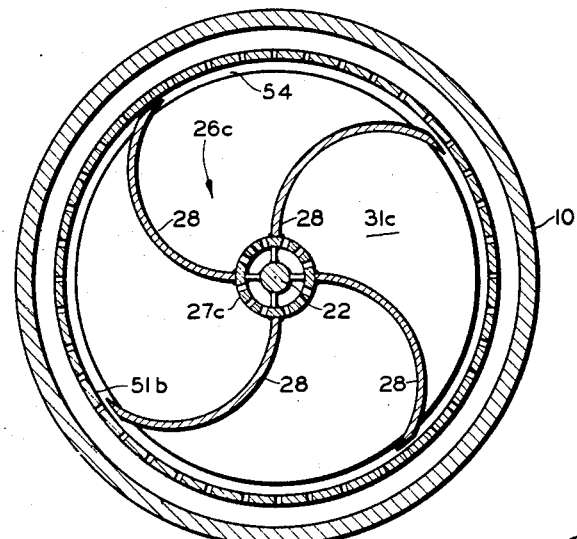
Figure 3:
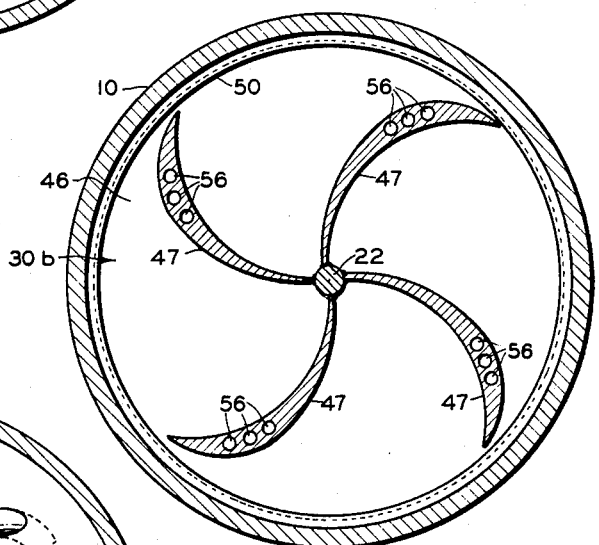
Figure 4:
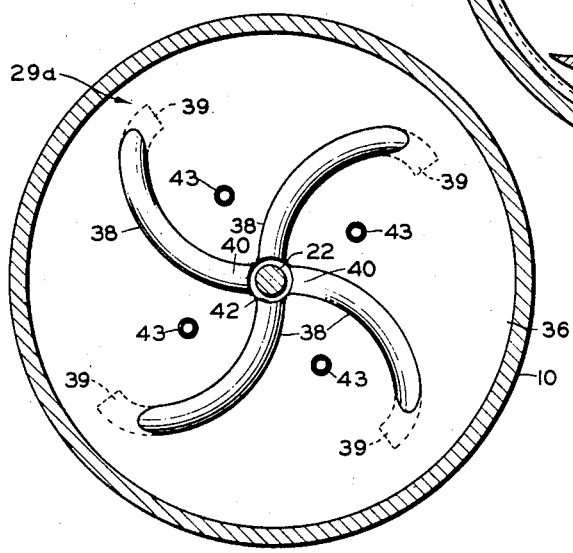

Various other objects, advantages and features of the invention will become apparent from the following detailed description taken in conjunction with the accompanying drawings, in which:

Figure 1 is a vertical sectional view partly in elevation of my novel liquid-liquid contacting apparatus; and Figures 2, 3 and 4 are, respectively, sectional views taken along the lines 2—2, 3—3, and 4—4 of Figure 1, looking in the direction of the arrows.

Referring now to the drawings in detail, and particularly to Figure 1, the apparatus comprises a generally cylindrical casing 10 having a lower frusto-conical end plate 11 partially defining a reservoir 12 for heavy liquid and an upper frusto-conical end plate 13 partially defining a reservoir 14 for light liquid. In the present preferred embodiment of the apparatus, the axis of the casing is positioned vertically and light liquid is admitted to the contacting vessel through an inlet 15 from which it passes upwardly through the contacting apparatus to the reservoir 14 and an outlet 16 at the top of the vessel, the back pressure at outlet 16 being controlled by a valve 17. Liquid of relatively high specific gravity is admitted through an inlet 18 from which it passes downwardly through the contacting apparatus in countercurrent flow with respect to the light liquid and finally reaches the reservoir 12 from which it is discharged through an outlet 19, the back pressure at outlet 19 being controlled by a valve 19a. A perforated screen 20 is provided adjacent reservoir 12 and a perforated screen 21 is provided adjacent reservoir 14, these screens tending to prevent mixing of the light and heavy liquids at the top and bottom portions of the vessel.

A vertically extending shaft 22 is journalled in the end plates 11 and 13, this shaft being driven by a suitable motor or other power source, not shown. Alternatively, the shaft may be journalled in suitable bearings formed in stationary plates within the vessel, as will become apparent from the following description. A series of impellers 26a to 26e, inclusive, are carried by the shaft, impeller 26e being mounted directly upon the shaft, and impellers 26a to 26d being carried partially by the shaft and partially by perforated sleeves 27a to 27d, inclusive, which rotate with the shaft. Each impeller includes a plurality of vanes 28, Figure 2, and these vanes are of the proper geometrical contour to provide a large difference in static pressure between the center and the periphery of the vessel, and a maximum separation between the heavy and light liquids with a minimum power requirement. It will be understood that the impellers provide a continuous phase of heavy liquid at the periphery of the vessel, and a continuous phase of light liquid at the inner region of the vessel, with a vertical, cylindrical interface between the phases. The impellers 26 are spaced at equal distances along the shaft, and liquid conveying units 29a, 29b, 30a, 30b are mounted between the respective impellers, these units cooperating with the casing 10 to form a separate chamber 31a to 31e for each of the impellers. It will be noted that the units 29 are disposed alternately with the units 30 so that each impeller chamber has a unit 29 at one end thereof and a unit 30 at its other end. It will also be noted that the impeller blades 28 completely fill chambers 31b to 31e, inclusive, except for cutaway portions 28a which are provided to accommodate Pitot tube units to be hereafter described.

Each of the sleeves 27 has a solid end piece 33 by which it is attached to the shaft and a number of perforations 34 are formed in the cylindrical portion of the sleeve. The unit 29a is formed from a pair of spaced annular plates 36 which are fixed to the casing 10 and each of these stationary plates has an inner flanged portion which cooperates with a flange on the adjacent rotating sleeve 27a or 27b to form a labyrinth joint 37. Mounted between the plates 36 is a series of arcuate generally radial tubes 38, Figures 1 and 4, each of which has an inlet portion 39 extending through the upper plate 36 and protruding into the upper adjacent impeller chamber 31a, the tip of the tube being oriented so that, when the impeller rotates, liquid from the outer region of the impeller chamber is forced into the tube inlets. Although the inlet portions, as shown, all lie in a common horizontal plane, they may in some cases be arranged in a helical formation to prevent interference between adjacent inlets. The outlet portion 40 of each tube 38 is positioned so as to discharge liquid into a central outlet chamber 42 which communicates with the perforated sleeves 27a and 27b. Accordingly, the tubes 38 are adapted to convey heavy liquid from the outer region of impeller chamber 31a to the inner annular chamber 42 from which a portion of the heavy liquid is recycled through sleeve 27a while the remainder of the heavy liquid passes through sleeve 27b into the lower adjacent impeller chamber 31b. The annular chamber 42, of course, may vary in size in accordance with the amount of liquid handled by the tubes 38. The tubes 38 resemble a shrouded pump impeller in construction while their operation is very similar to that of a group of Pitot tubes. That is, the tubes convert the velocity, potential energy, and pressure of the liquid entering their inlets into head capable of discharging such liquid through the tube outlets.

Unit 29a further includes a series of vertical nipples or pipes 43 which are disposed circumferentially of the shaft. These nipples are adapted to permit passage of the lighter liquid from the inner region of impeller chamber 31b to the inner region of impeller chamber 31a. The construction of unit 29b is similar to that of unit 29a, and accordingly, unit 29b is adapted to permit passage of heavy liquid from the outer region of chamber 31c to the inner region of chambers 31c and 31d, and also to permit passage of light liquid from the inner region of chamber 31d to the inner region of chamber 31c.

The unit 30b includes an annular plate 46 which is secured to the shaft 22 and rotates therewith. A series of blades or fins 47, Figures 1 and 3, are secured to the plate 46, these blades being of curved configuration and extending from the center or inner region of plate 46 to the periphery thereof. A plate 48 is secured to the blades 47 and this plate has a central opening 49 formed therein which communicates with the lower adjacent impeller chamber 31e. The curvature of the blades 47 is such that the unit 30b functions as a centrifugal pump impeller and, accordingly, liquid is conveyed thereby from the inner region of the impeller chamber 31e and forced against a double deflector 50 mounted at the periphery of the apparatus.

A pair of annular members 51c, 51d are closely spaced to unit 30b, and a similar pair of members 51a, 51b are provided for unit 30a. Member 51d is supported by a plate 53 attached to the casing 10 while each of the other members 51a, 51b, 51c is supported by the adjacent plate 36. Each of the members 51 has a flanged portion cooperating with a flange on the adjacent plate 46 or 48 to form a labyrinth seal 54 and, in addition, each member has a perforated portion extending circumferentially of the adjacent impeller 26. Accordingly, it will be apparent that light liquid drawn from the impeller chamber 31e by the unit 30b passes into the interspace between the members 51c, 51d and casing 10, a portion of this liquid being directed by deflector 50 through the member 51c into the impeller chamber 31d and the rest of said liquid being directed through member 51d into the impeller chamber 31e. The unit 30b is also provided with a series of longitudinal extending sets of bores 56, one set of these bores being formed in the outer portion of each of the vanes 47. The number and size of these bores is determined by the amount of heavy liquid to be handled by the apparatus.

These openings permit the flow of heavy liquid from the outer region of the impeller chamber 31d to the outer region of the impeller chamber 31e.

The construction of unit 30a is similar to that of unit 30b and, accordingly, unit 30a is adapted to convey light liquid from the inner region of impeller chamber 31c through perforated members 51a, 51b to the respective outer regions of chambers 31b and 31c. Unit 30a also permits passage of heavy liquid from the outer region of impeller chamber 31b to the outer region of impeller chamber 31c.

The operation of the contacting apparatus will now be apparent to those skilled in the art. Assuming that the shaft 22 is rotating, it will be apparent that the liquid in each impeller chamber is centrifuged with the result that the heavier liquid moves toward the outer region of the chamber while the lighter liquid moves toward the inner region of the chamber. In this manner, a vertical generally cylindrical interface is formed between the light and heavy liquids in each of the impeller chambers 31, the location of the interface being controllable by adjustment of back pressure regulators 17 and 19a. Thus, if the back pressure at the liquid outlet 17 is decreased and the back pressure at heavy liquid outlet 19a is increased, the proportion of heavy liquid in the vessel 10 is increased, with the result that the vertical cylindrical interface moves inwardly, that is, its radius is decreased. Conversely, if the back pressure at light liquid outlet 17 is increased and the back pressure at heavy liquid outlet 19a is decreased, the proportion of heavy liquid in the vessel is decreased, with the result that the vertical cylindrical interface moves outwardly, that is, its radius is increased.

The centrifugal separation in the chambers 31 permits countercurrent flow of liquids through the vessel, despite the dispersion of each phase into the other in the manner hereinafter described. Thus, assuming that the heavy liquid contains a component which is to be extracted by the light liquid, the heavy liquid entering through inlet 18 and passing downwardly to outlet 19 is progressively denuded of the component to be extracted therefrom by contact with light liquid which, at the top of the vessel, contains a substantial proportion of extracted material but which, at the bottom of the vessel, is substantially free from extracted material. That is, the light liquid, as it passes upwardly through the vessel from inlet 15 to outlet 16 becomes progressively richer in extracted material, as it is removed from the heavy liquid. It will be noted that this countercurrent action is made possible by the separation of the phases in each of the chambers 31 for, if this were not done, the liquid in the chamber would be a substantially homogeneous mixture and no countercurrent action could take place. It will be apparent that countercurrent flow will also take place if the light liquid contains a component to be extracted by the heavy liquid.

In accordance with the invention, this centrifugal separation, which allows countercurrent operation, is combined with intimate contacting of the phases through repeated dispersion of each phase as fine droplets into a continuous body of the other phase. It will be noted that in each chamber 31a, 31b, 31c, 31d, the centrifuged liquid moves in a circular direction, in contact with the inner perforated sleeve 27 and the outer perforated member 51, a continuous body of light liquid engaging the surface of sleeve 27, and a continuous body of heavy liquid engaging the outer perforated member 51. Accordingly, heavy liquid collected from the outer regions of the impeller chambers 31a, 31c by the tube units 29a, 29b flows through the sleeves 27 whereby the perforations in the sleeves divide the stream into droplets which are subjected to a mild shearing action by the light liquid within the impeller chamber. Similarly, light liquid collected from the inner regions of impeller chambers 26c, 26e by the units 30a, 30b flows through the members 51 and is divided into droplets by the perforations therein, these droplets being subjected to a shearing engagement by the centrifuged continuous body of heavy liquid in the impeller chambers. This shearing action produces an extremely intimate engagement between the liquids to be contacted.

In impeller chambers 31b and 31d, the entire volume of light liquid flows into the chamber through perforated member 51 and out of the chamber through openings 43, while the entire volume of heavy liquid flows in through perforated sleeve 27 and out through nipples 56. In impeller chamber 31c, a portion of the light liquid is recycled, this liquid passing through opening 49, unit 30a, and perforated member 51b. A portion of the heavy liquid is recycled through the tubes 38 of unit 29b and sleeve 27c. The remainder of the flow in chamber 31c comprises heavy liquid flowing from nipples 56 in unit 30a to tubes 38 in unit 29b, together with light liquid flowing from openings 43 in unit 29b to opening 49 in unit 30a. Chambers 31a, 31e are primarily zones of unhindered centrifugal separation, although there is some dispersion of droplets of heavy liquid through sleeve 27a into the adjacent continuous body of light liquid in chamber 31a. The impellers in chambers 31a, 31e, together with the screens 20, 21 are also useful in purifying the exit streams of liquid.

Accordingly, the progress of light liquid can be traced through the entire contacting apparatus through inlet 15, opening 49 in centrifugal impeller unit 30b, the perforations in sleeve 51c, the inner region of impeller chamber 31d, the nipples 43 in unit 29b, the inner region of impeller chamber 31c, the opening 49 in the centrifugal impeller unit 30a, perforated member 51a, the inner region of impeller chamber 31b, the nipples 43 in unit 29a, and the perforations in plate 21, to the light liquid outlet 16. It will be noted, however, that a portion of the liquid passing through each centrifugal impeller unit 30 is recycled through the respective perforated members 51b and 51d, the amount of this recycled liquid being controlled by varying the number and size of perforations. Similarly, the flow of heavy liquid may be traced from inlet 18, through the outer region of impeller chamber 31a, the tubes 38 in unit 29a, the sleeve 27b, the outer region of impeller chamber 31b, the openings 56 in unit 30a, the outer region of impeller chamber 31c, the tubes 38 of unit 29b, the sleeve 27d, the outer region of impeller chamber 31d, the openings 56 in impeller unit 30b, and the perforations in plate 20 to the heavy liquid outlet 19. A portion of the heavy liquid is also recycled through the sleeves 27a and 27c, from the units 29a and 29b, respectively, the amount of this recycled liquid being controlled by the size and spacing of the perforations in said sleeves.

It will be apparent that I have provided countercurrent contacting apparatus in which countercurrent flow is combined with repeated dispersion of droplets of heavy liquid into a continuous phase of light liquid at the sleeves 27, and dispersion of droplets of light liquid into a continuous phase of heavy liquid at perforated members 51. The dispersion at members 51 is accompanied by a pronounced shearing action since the continuous phase of heavy liquid moves rapidly, in a perpendicular direction, relative to the radially directed droplets of light liquid passing inwardly through the members 51 while the dispersion at sleeves 27 is accompanied by a milder shearing action. It is to be clearly understood, however, that very advantageous results may be obtained by the use of a combination of one method of dispersion with countercurrent flow although the combination of both methods of dispersion produces unusually good results.

In some cases, the impellers 26 may be replaced by discs which may be of conical configuration to mark the limits of the dispersal zones. Although, in the described embodiment, the flow of liquid from top to bottom or vice versa is caused by gravity, this is not essential, as my contacting device will work equally well in a horizontal position provided that the shaft is rotated with sufficient speed as to provide a centrifugal force two or three times as large as the force of gravity. If desired, the impellers may be designed to assist in the movement of light liquid from the bottom to the top of the vessel and stationary diffuser vanes may be mounted on the casing and units 29 so as to assist in the movement of heavy liquid through the several stages from the top to the bottom of the vessel. Further, the number of stages may be varied by providing a larger or smaller number of impellers 26 and units 29 and 30.

While the relative amounts of the two phases within the contacting apparatus is not critical, so long as there is enough of the heavy phase present to cover the inlets of elements 29a and 29b, there will be many cases where their rates of feed to the apparatus is quite different. In most such cases, as in treatment of a lighter organic phase with a heavier inorganic phase (alkylation, olefin solution in acids) the flow of the heavy phase is smaller than that of the light phase. To retain within the apparatus in such cases a desired ratio of the phases which is supplied on starting up and which may differ from the ratio of the feeds, it is only necessary to adjust the valves 17 and 19a to regulate the back pressure at the heavy and light liquid outlets. In some cases, the function of the centrifugal impellers 26 may be combined with that of the centrifugal pump units 30a and 30b by providing a pump unit consisting of a facing pair of steel stampings keyed to the shaft, upon which are impressed proper liquid courses. The space betwen each pair of discs forms the unit 30 while the outer surfaces of each such pair define the centrifugal pump impellers 26. Adjacent each pair of stampings is a second pair of members which are shaped to form the Pitot tube assemblies 29 upon keying of said members to the shaft.

As a specific example of the use of the described contacting apparatus, a relatively heavy liquid such as furfural is introduced through inlet 18 and passes downwardly through the vessel to heavy liquid outlet 19. A relatively light liquid, such as a hydrocarbon mixture from which impurities are to be extracted by the furfural, is admitted through light liquid inlet 15, and this hydrocarbon mixture passes upwardly through vessel 10 to light liquid outlet 16. As the shaft 22 is rotated, droplets of hydrocarbon mixture are dispersed through the perforated members 51 into a continuous body of furfural, and droplets of furfural are dispersed through sleeves 27 into a continuous phase of relatively light hydrocarbon mixture. Due to the intimate contact effected by this dispersion, the impurities in the hydrocarbon mixture are absorbed by the furfural. The separation provided by the centrifugal impellers 26 in each of the chambers 31 permits countercurrent flow to be obtained. Thus, in chamber 31d, the original contaminated hydrocarbon mixture is contacted with furfural containing a substantial quantity of absorbed impurities but this relatively impure furfural is still capable of absorbing a substantial quantity of material from the original hydrocarbon mixture. In chamber 31c, furfural containing a smaller quantity of impurities than that in chamber 31d is contacted with the hydrocarbon mixture from chamber 31d from which, as stated, a substantial amount of impurities has already been removed. In chamber 31b, hydrocarbon mixture from chamber 31c containing only a small amount of impurities is contacted with the pure furfural introduced through inlet 18 and this small or residual amount of impurities is readily absorbed by the furfural. It is to be understood, of course, that the invention is applicable to other types of liquid-liquid contacting and the treatment of the mixture of furfural is set forth as a specific example only.

While the invention has been described in connection with a present, preferred embodiment thereof, it is to be understood that this description is illustrative only and is not intended to limit the invention, the scope of which is defined by the appended claims.

Having described my invention, I claim:

1. In the art of contacting immiscible liquids, the steps which consist in producing rotary movement of an annular body of liquid, directing a stream of liquid droplets radially into the peripheral region of said rotating body, and directing another stream of liquid droplets radially against the inner surface of said rotating body whereby the rotating liquid body contacts the two streams of liquid particles with a shearing action.

2. In the art of contacting immiscible liquids, the steps which consist in centrifuging a body of liquid to separate heavier liquid particles from lighter liquid particles, directing droplets of heavy liquid into the inner region of the centrifuged body, directing droplets of light liquid into the peripheral regions of the centrifuged body, removing light liquid from the interior region of the centrifuged body, and removing heavy liquid from the outer region of the centrifuged body.

3. In the art of contacting immiscible liquids, the steps which consist in centrifuging a body of liquid to separate the heavier and lighter components thereof, directing droplets of heavy liquid into the center of the centrifuged body in a radial direction, directing droplets of light liquid into the periphery of the centrifuged body in a radial direction whereby said particles are contacted by the centrifuged body with a shearing action, removing light liquid from the inner region of the centrifuged body, and removing heavy liquid from the outer region of the centrifuged body.

4. In the art of contacting immiscible liquids, the steps which consist in producing rotary movement of an annular body of liquid, and directing a stream composed of a multiplicity of discrete liquid droplets through a perforated member radially into the peripheral region of the rotating body, whereby the rotating body contacts the liquid particles with a shearing action.

5. In the art of contacting immiscible liquids, the steps which consist in centrifuging a liquid in a plurality of zones to separate the heavier and lighter components thereof and thereby form an annular body of liquid in each zone, withdrawing light liquid from the central portion of one contacting zone and introducing it at the periphery of another contacting zone.

6. In the art of contacting immiscible liquids, the steps which consist in centrifuging a liquid in a plurality of zones to separate the heavier and lighter components thereof and thereby form an annular body of liquid in each zone, withdrawing heavy liquid from the peripheral region of one zone, and introducing such heavy liquid at the central region of another contacting zone.

7. In the art of contacting immiscible liquids, the steps which consist in centrifuging a liquid in a plurality of zones to separate the heavier and lighter components thereof and thereby form an annular body of liquid in each zone, withdrawing light liquid from the central region of one zone, and introducing it at the periphery of another contacting zone, withdrawing heavy liquid from the peripheral region of said one zone and introducing such heavy liquid at the central region of said other zone.

8. In the art of contacting immiscible liquids, the steps which consist in centrifuging a liquid in a plurality of zones to separate the heavier and lighter components thereof and thereby form an annular body of liquid in each zone, withdrawing light liquid from the central portion of one contacting zone, transforming the withdrawn liquid into droplets, and introducing the droplets at the periphery of another contacting zone.

9. In the art of contacting immiscible liquids, the steps which consist in centrifuging a liquid in a plurality of zones to separate the heavier and lighter components thereof and thereby form an annular body of liquid in each zone, withdrawing heavy liquid from the peripheral region of one zone, transforming the withdrawn liquid into droplets, and introducing the droplets at the central region of another contacting zone.

10. In the art of contacting immiscible liquids, the steps which consist in centrifuging a liquid in a plurality of zones to separate the heavier and lighter components thereof and thereby form an annular body of liquid in each zone, withdrawing light liquid from the central region of one zone, transforming the withdrawn liquid into droplets, and introducing the droplets at the periphery of another contacting zone, withdrawing heavy liquid from the peripheral region of said one zone, transforming the withdrawn liquid into droplets and introducing said droplets at the central region of said other zone.

11. In the art of contacting immiscible liquids, the steps which consist in producing rotary movement of an annular body of liquid, and directing a stream composed of a multiplicity of discrete liquid droplets through a perforated member radially into the inner region of the rotating body, whereby the rotating body contacts the liquid particles with a shearing action.

12. In the art of contacting immiscible liquids, the steps which consist in centrifuging a body of liquid having components of different specific gravities to provide an outer zone of a heavier component and an inner zone of a lighter component, separately withdrawing said components from said liquid body, continuously passing a stream of one component in the form of a multiplicity of discrete droplets through a perforated member into the zone of the other component, and separately introducing said other component into said body of liquid.

13. In the art of contacting immiscible liquids, the steps which consist in centrifuging a body of liquid having components of different specific gravities to provide an outer zone of a heavier component and an inner zone of a lighter component, separately withdrawing said components from said liquid body, continuously passing a stream of said lighter component into the form of a multiplicity of discrete droplets through a perforated member into the peripheral region of said zone of a heavier component, and separately introducing said heavier component into said body of liquid.

14. In the art of contacting immiscible liquids, the steps which consist in centrifuging a body of liquid having components of different specific gravities to provide an outer zone of a heavier component and an inner zone of a lighter component, separately withdrawing said components from said liquid body, continuously passing a stream of said heavier component in the form of a multiplicity of discrete droplets through a perforated member into the inner region of said zone of the lighter component, and separately introducing said lighter component into said body of liquid.

References Cited in the file of this patent

UNITED STATES PATENTS

| | | |
|---|---|---|
| Re. 21,168 | Couter | Aug. 1, 1939 |
| 542,756 | Ekenberg | July 16, 1895 |
| 2,063,789 | Burk | Dec. 8, 1936 |
| 2,091,645 | McConnell | Aug. 31, 1937 |
| 2,150,491 | Cope | Mar. 14, 1939 |
| 2,234,921 | Webb | Mar. 11, 1941 |
| 2,266,521 | Van Dijck | Dec. 16, 1941 |